Feb. 7, 1933.  A. HAMMER  1,896,447
CLAMP FOR WIRE FENCES
Filed Dec. 29, 1931  3 Sheets-Sheet 1
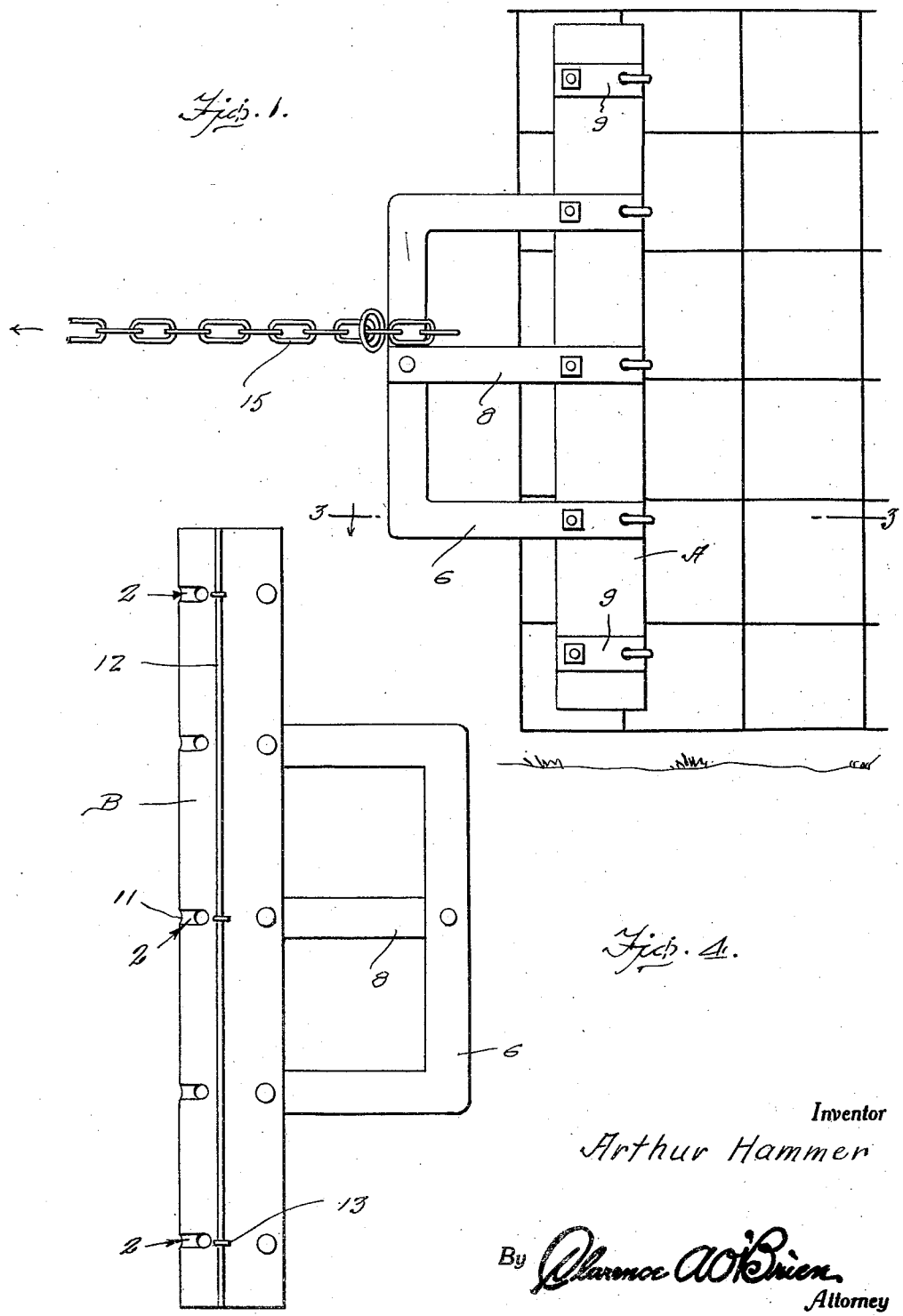
Inventor
Arthur Hammer
By Clarence A. O'Brien
Attorney Feb. 7, 1933.  A. HAMMER  1,896,447
CLAMP FOR WIRE FENCES
Filed Dec. 29, 1931  3 Sheets-Sheet 2
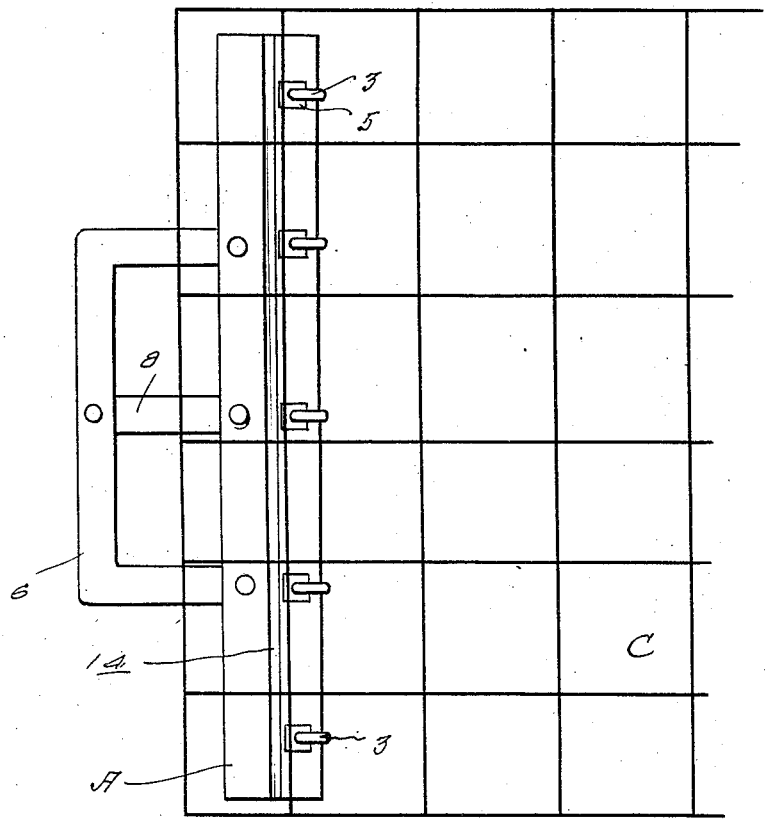
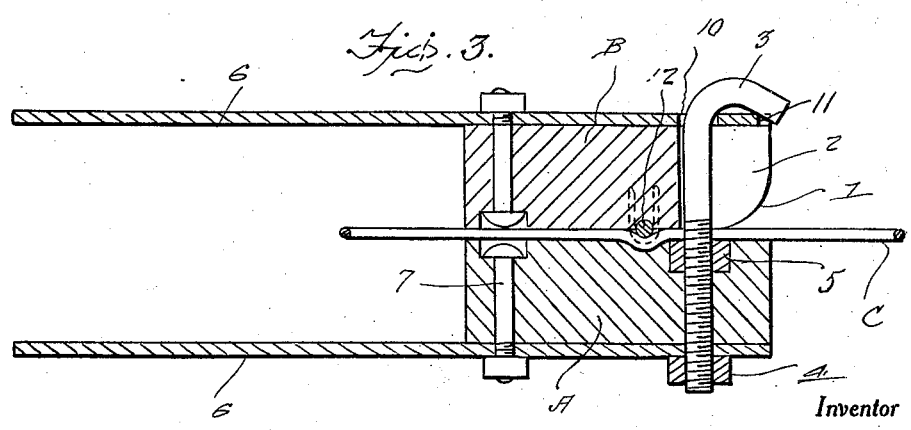
Inventor
Arthur Hammer
By Clarence A. O'Brien
Attorney Feb. 7, 1933. A. HAMMER 1,896,447
CLAMP FOR WIRE FENCES
Filed Dec. 29, 1931 3 Sheets-Sheet 3
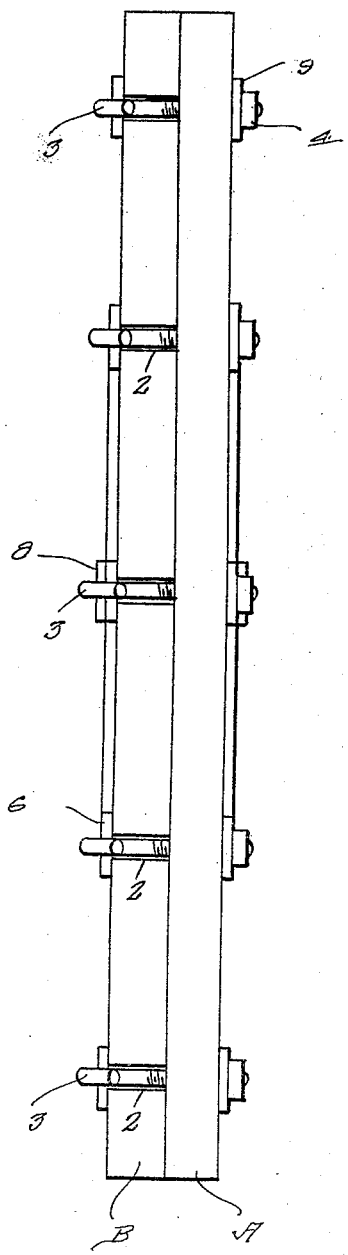
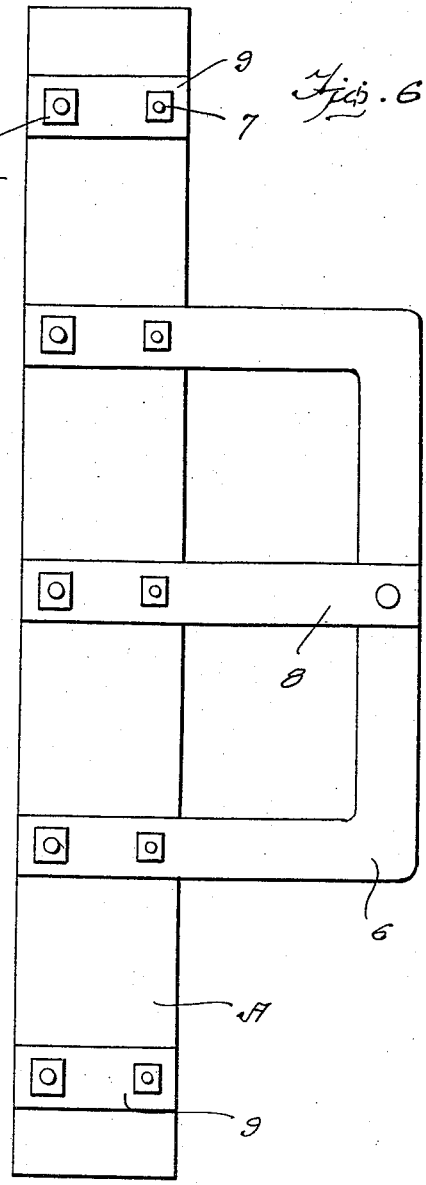
Inventor
Arthur Hammer
By Clarence A. O'Brien
Attorney Patented Feb. 7, 1933

1,896,447

UNITED STATES PATENT OFFICE

ARTHUR HAMMER, OF TOMPKINSVILLE, KENTUCKY

CLAMP FOR WIRE FENCES

Application filed December 29, 1931. Serial No. 583,763.

This invention relates to a clamp which is mainly designed for use in putting up woven wire fences but which of course can be used for other purposes, the general object of the invention being to provide a pair of elongated members with hooks on one member engaging keeper parts in the other member for detachably and hingedly connecting the two members together, with frames on the two members for receiving a chain or the like which acts to cause the two members to clamp the fence or wires so that the same can be stretched and attached to the posts.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is an elevation showing the device in use.

Fig. 2 is a similar view but showing the member, provided with the keeper parts, removed.

Fig. 3 is a section on line 3—3 of Fig. 1.

Fig. 4 is a view of the inner face of the member which is provided with the keeper parts.

Fig. 5 is a view of the rear part of the device.

Fig. 6 is an outer view of the hook carrying member.

In these drawings, the letters A and B indicate the two clamping members which are of elongated form and of substantially rectangular shape in cross section though the inner rear corner of the member B is rounded as shown at 1 in order to permit this member to rock on the member A. The rear edge of the member B is formed with the notches 2 and hooks 3 are carried by the member A and are adapted to pass through the notches when the parts are in clamping position.

The hooks are provided with threaded shanks, and the outer end of the threaded part of each shank is engaged by a nut 4 and a nut 5 engages the inner part of the threaded portion and is located in a recess in the inner face of the member A. These nuts permit the hooks to be adjusted, by loosening the outer nut 4 and then partly pulling the hook with the nut 5 from the member A so the nut 5 can be adjusted after which it is replaced in the recess and the nut 4 tightened to hold the bolt in its adjusted position.

A yoke-shaped frame 6 is bolted to the outer face of each of the members A and B by the bolts 7, the heads of which are countersunk in the inner face of each member, and a pair of the hooks 3 have their threaded portions passing through the limbs of the member 6 which is attached to the member A.

A centrally arranged bar 8 is fastened to the bight of the frame 6 and is also bolted to the member to which the yoke-shaped part 6 is connected, and one of the hooks 3 has its threaded part passing through that bar 8 which is connected with the member A. Transversely extending plates 9 are placed on the outer faces of the two members and bolted thereto by bolts similar to the bolts 7 and two of the hooks 3 pass through the plates 9 on the member A.

The plates 9, the limbs of the yoke member 6 and the inner end of the bar 8 which are connected with the member B all extend over the notches 2 in the member B and these parts are formed with the holes 10 for receiving the curved portions of the hooks and with recesses 11 in their ends for receiving the beaks of the hooks as clearly shown in Fig. 3.

A bar 12 extends longitudinally across the inner face of the member B and is held thereon by the staples 13 and the inner face of the member A is formed with the longitudinally extending groove 14 to receive this bar 12, when the parts are in clamping position as shown in Fig. 3.

The preferred manner of using the device is as follows:—The member A is placed on the ground and then the wire C is placed on it and then by stepping on the wire the wire is held down and then the member B is held in a position to cause the hooks 3 to enter the openings 10 and the member B swung down onto the member A with the wire between them. A chain 15 has one end placed around the bight of the members 6. The wire with the clamp is then placed in vertical position and by pulling upon the chain the members A and B are caused to firmly clamp the wire and at the same time exert a pull upon the same to stretch the wires so that they can be fastened to the posts. The groove 14 and the rod 12 will form kinks in the wires as shown in Fig. 3, so as to increase the clamping action of the two members A and B on the fence.

It is thought from the foregoing description that the advantages and novel features of the invention will be readily apparent.

It is to be understood that changes may be made in the construction and in the combination and arrangement of the several parts, provided that such changes fall within the scope of the appended claims.

Having thus described my invention, what I claim as new is:—

1. A clamp of the class described comprising a pair of elongated members, the rear edge of one member having notches therein, plates connected with the outer face of the last-named member and having portions extending over the notches, said portions having holes therein and said portions of said plates having recesses in their rear ends, and hooks carried by the other member for passing through the notches and thru the holes with their beaks engaging the recesses to hingedly and removably connect the two members together.

2. A clamp of the class described comprising a pair of elongated members, the rear edge of one member having notches therein, plates connected with the outer face of the last-named member and having portions extending over the notches, said portions having holes therein and said portions of said plates having recesses in their rear ends, hooks carried by the other member for passing through the notches and through the holes with their beaks engaging the recesses to hingedly and removably connect the two members together, and means for adjusting the position of the hooks in the hook carrying member.

3. A device of the class described comprising two elongated members, one member having notches in its rear part, hooks carried by the other member for passing through the notches, a yoke-shaped member connected to the outer face of each member with the limbs of the member attached to the notched member passing over some of the notches, plates passing over the other notches, limbs and said plates having holes therein for receiving the hooks of the other member, means for adjusting the hooks in the said other member, a flexible member engaging the bight of the yoke members and pressing said yoke members and the first-mentioned members towards each other to clamp an object between the first-mentioned members.

4. A clamp of the class described comprising a pair of elongated members, the rear edge of one member having notches therein, plates connected with the outer face of the last-named member and having portions extending over the notches, said portions having holes therein, hooks carried by the other member passing through the notches and through the holes to hingedly and removably connect the two members together.

5. A clamp of the class described comprising a pair of elongated members, the rear edge of one member having notches therein, plates connected with the outer face of the last-named member and having portions extending over the notches, said portions having holes therein, and said portions of said plates having recesses in their rear ends, hooks carried by the other member for passing through the notches and through the holes with their beaks engaging the recesses to hingedly and removably connect the two members together, means for adjusting the position of the hooks in the hook carrying member, said member having a longitudinally extending groove in its inner face, and a rod connected to the inner face of the other member and fitting in the groove when the two members are placed together.

In testimony whereof I affix my signature.

ARTHUR HAMMER.